United States Patent [19]

Teatini

[11] 3,945,393

[45] Mar. 23, 1976

[54] REGULATING VALVE

[76] Inventor: Giuseppe Teatini, Via della Bastia, 20, Casalecchio di Reno, Bologna, Italy, 40033

[22] Filed: Aug. 30, 1974

[21] Appl. No.: 502,011

Related U.S. Application Data

[63] Continuation-in-part of Ser. No. 446,402, Feb. 27, 1974, abandoned, which is a continuation-in-part of Ser. No. 331,898, Feb. 12, 1973, abandoned.

[52] U.S. Cl. ............... 137/220; 137/222; 137/486; 137/490
[51] Int. Cl.² ........................................ G05D 16/10
[58] Field of Search ........... 137/219, 220, 221, 222, 137/486, 490

[56] References Cited
UNITED STATES PATENTS

| | | | |
|---|---|---|---|
| 2,608,985 | 9/1952 | Arthur | 137/490 X |
| 2,655,935 | 10/1953 | Kinzbach | 137/538 |

*Primary Examiner*—Alan Cohan
*Assistant Examiner*—Gerald A. Michalsky
*Attorney, Agent, or Firm*—Brisebois & Kruger

[57] ABSTRACT

Flow rate limiting valve for pipes for liquid or gaseous fluids of the type comprising a cup plug which extends telescopically from an ogival chamber contained in the valve body, and communicates with the fluid upstream of the valve seat by a channel in the fixed part and with the fluid downstream of the valve seat by a channel in the head of the cup plug, being possible to close or throttle said second channel by a needle which extends to the outside of the ogival chamber and terminates with an orthogonal disc receiving the hydrodynamic thrust of at least a part of the lines of flow of the entering fluid, comprises external control device to regulate the thrust, the lever arm and the tilt of the spring to lever which transmits the thrust of the calibrating spring to the needle, thus being possible to determine, by acting on these external means; the flow rate, the opening and the closure of the valve, along with his characteristic-curve and the flow rate value.

11 Claims, 4 Drawing Figures

REGULATING VALVE

This application is a continuation-in-part of my prior application Ser. No. 446,402, filed Feb. 27, 1974, now abandoned, which was itself a continuation-in-part of my still earlier application Ser. No. 331,898, filed Feb. 12, 1973, now abandoned.

SUMMARY OF THE INVENTION

The distribution and processing networks for many liquid and gaseous fluids, such as petrol, hydrocarbons in general, water or hydrocarbon vapours, and various gases and liquids, whether dealing with fluids of low or high viscosity, must make the fluid available at the delivery ducts at flow rates and pressures which vary over only very small ranges.

This is necessary both because of the particular characteristics of certain types of fluid, for example liquefied petroleum gas which must be maintained in the liquid state under pressure, and because of the requirements of any instruments connected in series which are guaranteed precise, effective or reliable only if supplied under well defined conditions, such as flow meters, filters, and the like.

In particular in distribution stations for fuels or the like, at filling stations for road tankers, special valves are situated upstream of the measuring instruments which are servo-operated by the fluid which they control, or by another suitable fluid, and which can be calilbrated in terms of a certain degree of opening but do not guarantee the maintaining of a required flow rate, and which therefore in certain cases can feed to the measuring instruments connected in series a flow of fluid which is not suitable for guaranteeing measurement precision and for safeguarding the integrity of the instrument.

This makes it necessary to connect in series with said valves other valve assemblies for controlling the flow, arranged to interact with the former for guaranteeing the required results.

The presence of these flow control valves, in addition to heavy installation and maintenance costs due to their high complexity, also make the delivery stations very bulky.

It must be stated, in order to better understand the importance and scope of the invention to be described, that at present delivery valves are known which can be automatically controlled by the controlled fluid and are sensitive to the pressure of the fluid, which also circulates in the regulation members, both downstream and upstream. This is made possible by suitably modulating the control pressure of a balanced plug. Valves are also known in which the required degree of opening of the valve can be obtained by positioning inside the valve a needle arranged to close a discharge bore in the plug member, this needle moving in its seat under the action of external control devices.

Furthermore, in the different technical fields concerning the inflow of air into a cabin of an aircraft, valves are known in which the required degree of opening of the valve can be obtained by positioning inside the valve a needle arranged to close a discharge bore in the plug member, this needle moving in its seat under the thrust action of a member which intercepts the dynamic thrust of the fluid flow which enters the valve. The effect of the thrust action which operates the needle adds to the effect of a calibration spring, which can render the needle less or more sensitive to the dynamic thrust of the fluid.

A device of this type is described in the U.S. Pat. No. 2,608,985 in the name of R. A. ARTHUR.

The known valves of the ARTHUR'S type present a characteristic curve showing the variation of the flow rate as a function of the pressure upstream of the valve, which may tend to rise; on the contrary in the flow rate limiting valves it is sometimes highly desirable that the above characteristic curve tends to lower and the flow rate decreases when the upstream pressure increases; furthermore these valves can not be controlled by external means for opening and closure, with respect to the determination of the desired characteristic-curve, and of the flow rate value.

One object, of the present invention is to provide a flow rate limiting valve in which the characteristic-curve which relates the flow rate to the pressure upstream may be determined and controlled by suitable external means, and therefore may tend to decrease when the pressure upstream of the valve tends to increase.

A further object of the present invention is to provide a flow rate limiting valve which can be controlled by external means for opening and closure.

According to the present invention the above objectives are achieved by transmitting the thrust (or traction) of the calibrating spring to the needle by means of a lever, and by positioning the calibrating spring inclined to the lever in order that the lever arm of the spring can vary during the operation of the lever, and furthermore by providing suitable external means for regulating the tension of the spring and the tilt of the spring in respect to the lever.

It will be pointed out that by regulating the tension, (and therefore the thrust or the traction) of the spring, the flow rate will be determined at the desired value, and by regulating the tilt of the spring to the lever, the tendency of the characteristic curve to lower (and therefore the tendency of the valve to over-limit the flow rate) will be achieved when the upstream pressure will increase.

In order to better demonstrate the operational and constructional advantages and characteristics of the invention, a description is given hereinafter of a preferred embodiment illustrated by way of non-limiting example in the accompanying drawing.

Figure 1:
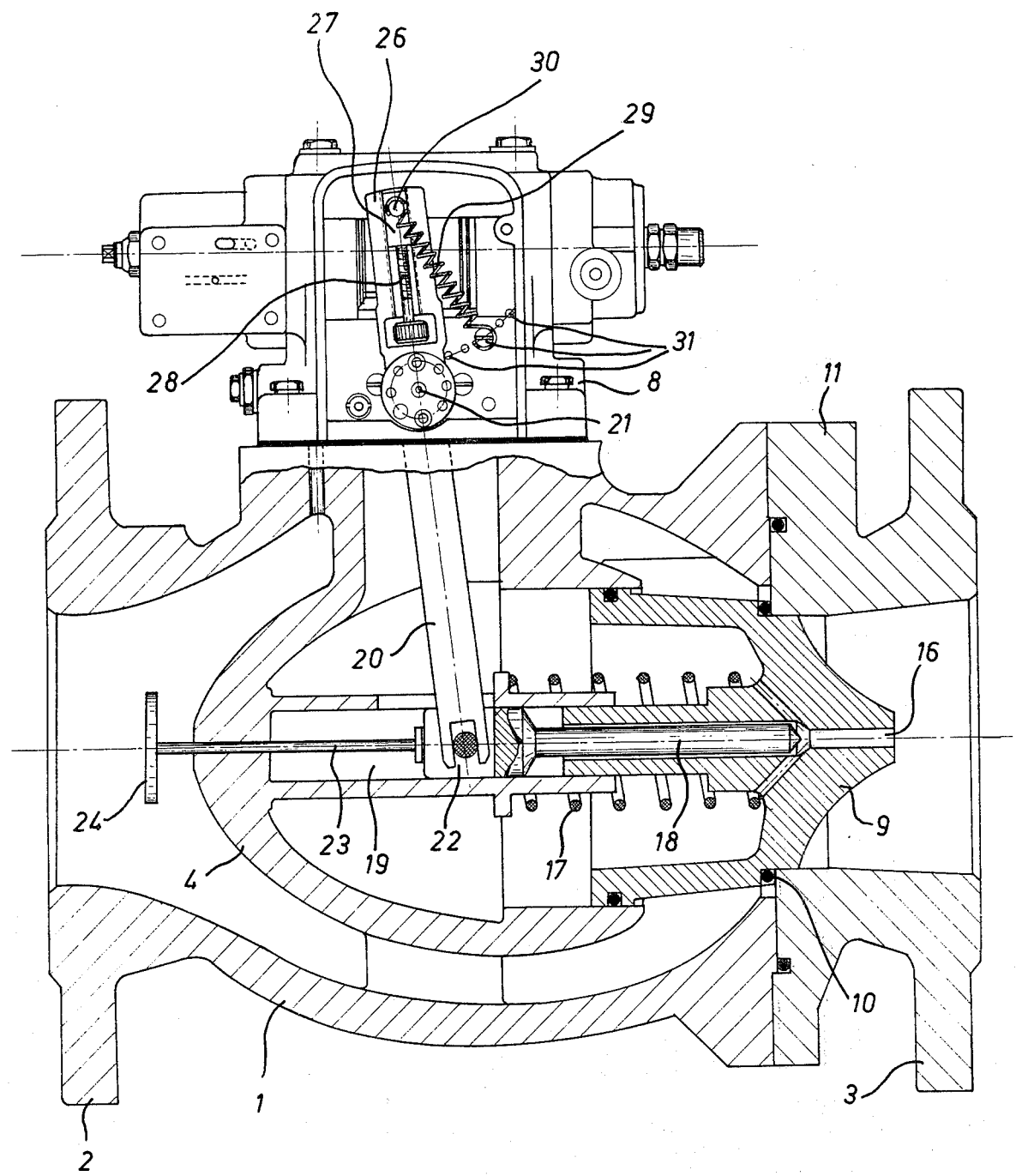
FIG. 1 is a vertical axial section through a valve according to the invention.
Figure 2:
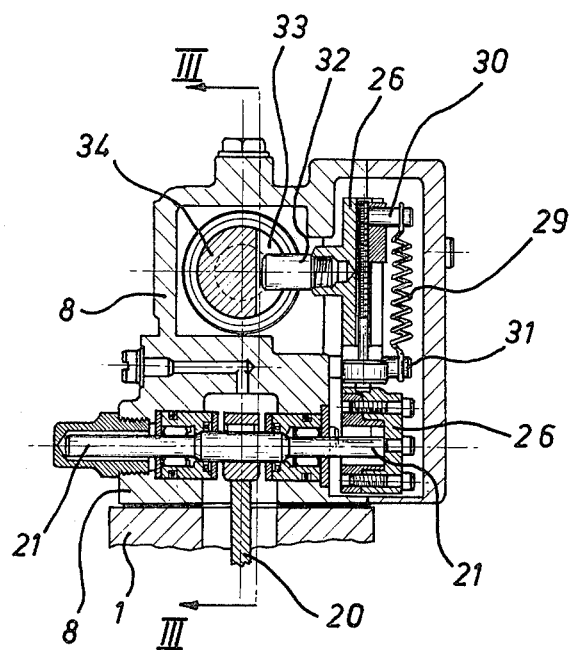
FIG. 2 is a partial vertical axial section on the line II—II of FIG. 3.
Figure 3:
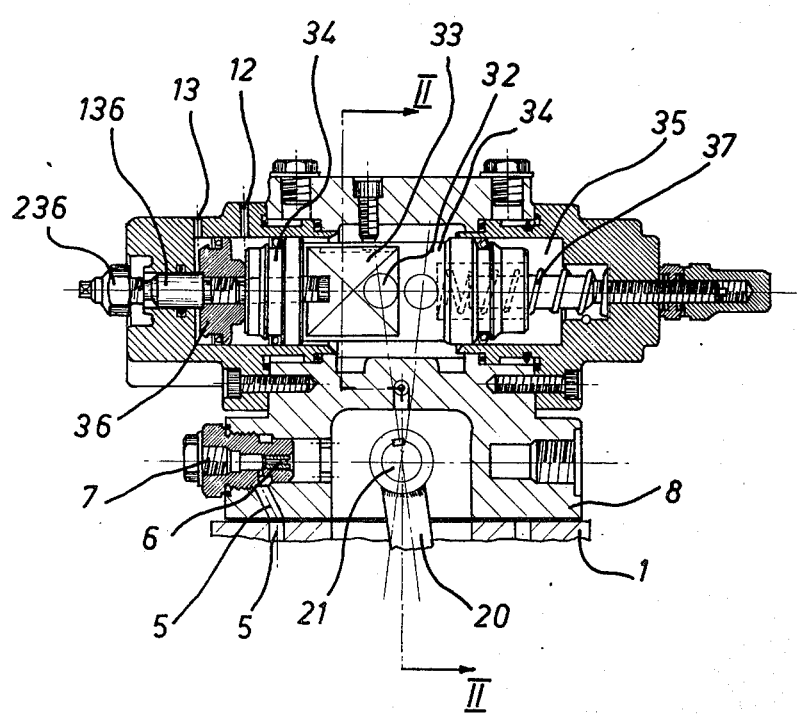
FIG. 3 is a partial section on the line III—III of FIG. 2.

FIGS. 1 to 3 show the valve bodies 1, 8 and 11 comprising flanges 2 and 3 the inlet and outlet ducts for the fluid respectively.

Inside the body 1 is suspended a chamber 4 of ogival form, in communication with the valve delivery duct by means of the channel 5 throttled by the calibrated orifice 6 which is interchangeable by removing the cap 7.

The top of the cavity defined by the ogive is sealed by the body 8 which closes the top of the valve body 1.

A cup shaped plug 9 slides axially in the front part of the ogive 4 and engages tightly in the seat 10 formed in a body 11 which completes the body 1 at the front and comprises the flange 3.

The cup shaped plug comprises a front bore 16, suitably larger than the orifice 6, which emerges downstream of the plug.

Finally there is a spring 17 arranged to keep the plug 9 pushed against its seat 10 in the absence of flow in the valve.

The bore 16 of the plug may be closed or throttled by a needle 18 which slides axially in a seat 19 rigid with the ogive 4.

The axial position of the needle 18 is determined by the position of the forked lever 20 which oscillates about the pivot 21 and engages in the block 22 of the needle 18.

Against the block 22 of the needle 18 there also engages the base of a stem 23 which emerges axially from the ogive 4 and carries at its other end a disc or other equivalent passive resistance 24. The disc 24 is exactly at the centre of the inlet port for the fluid, and is subject to the dynamic thrust of the fluid flow.

The lever 20 is keyed on a pivot pin 21 which is fixed outside the body 8 to an arm 26 to which the elastic means resisting the thrust action on the needle 18 are connected.

The arm 26 comprises a groove between the two sides of which slides a block 27.

The position of the block 27 is calibrated by a micrometer screw 28.

The body 8 comprises several terminal bolts 31 located on a circumference whose center is substantially at 30.

A spring 29 connects the orthogonal pin 30 deriving from the block 27 to one of the bolts 31 screwed into the body.

From the arm 26 derives aan appendix 32, opposite to the pin 30, which projects into a recess 33 in the transverse piston 34.

The piston 34 slides into a cylindrical chamber 35 and moves to the right FIG. 3 under the pressure of a fluid which enters by the duct 12; consequently the arm 26 and the lever 20 rotates to move to the left the needle 18 and consequently to open the valve.

The motion to the right of the piston 34 occurs against the thrust of the spring 37.

In order to bring about a two-stage closure of the valve, a piston 36 is provided, which can move to the right FIG. 3 under the pressure of a fluid which enters by the duct 13.

The travel to right of the piston 36 is limited by the stem 136 and the nut 236.

When the valve has to be closed, firstly the controlling fluid is evacuated through the duct 12 and therefore the piston 34 travels to left and stops against the piston 36; successively the fluid is evacuated through the duct 13 and also the piston 36 moves to the left quickly, to close completely the valve.

The recess 33 is larger than the diameter of the appendix 32, in order to permit the latter to move freely into the recess.

When closed FIG. 1 the plug 9 is kept against the seat 10 by the upstream pressure which is greater than the downstream pressure acting on the plug 9.

In this condition the needle 18 closes the bore 16 by the action of the spring 37 which acts in this sense on the arm 26 and the lever 20 to overcome the action of the spring 29.

The opening of the valve takes place in this case by operating the piston 34 which cancels the action of the spring 37. In this condition the needle 18 is moved away by the action of the spring 29 and opens the bore 16. As this latter is larger than the orifice 6 there is a pressure drop in the ogival chamber and the plug is pushed backvards and hence opened by the effect of the difference in cross-section between the sliding seat of the plug in the ogival chamber and the closing seat 10.

As the plug withdraws it tends to move the bore 16 on the needle 18, and stops in a position of equilibrium with the needle 18 which throttles the bore 16. As can be seen from FIG. 1, the spring 29 tends to move the needle 18 away from the bore 16 so favouring the opening of the valve, whereas the needle 18 is kept thrust in the opposite direction during operation of the valve by the hydrodynamic thrust against the disc 24. In this condition the required equilibrium between the hydrodynamic thrust which depends on the flow rate and the action of the spring 29 is created, so that the flow rate through the valve is maintained substantially constant.

It will be seen hereinafter that the flow rate, in the valve according to the invention, can be maintained both independent from the upstream pressure, or dependent therefrom, according to the desired curve (a) or (c) in FIG. 4.

It is obvious that a reduction of flow rate causes a reduction of the hydrodynamic thrust of the disc 24 so causing the action of the spring 29 to prevail and withdraw the needle 18 from the cup 9 so that this latter moves into a more withdrawn equilibrium position, corresponding to a greater degree of opening of the valve so restoring the flow rate. The reverse happens for increases in flow rate, which cause the cup 9 to move towards the ring of FIG. 1.

According to the invention, the traction of the spring 29 may be controlled by adjusting the screw 28 in order to obtain the desired value of the flow rate during the working of the valve.

In fact as the spread between the axis of the pin 21 and the pin 30 increases, the lever arm of the thrust of the spring 29 in respect with the axis of the pin 21 tends to decrease when the arm 26 rotates to left in FIG. 1, thus balancing the increased tension of the more extended spring 29.

The tilt of the spring 29 in respect with the lever 20, and therefore the torque of the spring 29 in respect with the axis of the pin 21 may be controlled by choosing the terminal bolt 31 which the spring is connected to; in this way the more suitable characteristic-curve may be determined.

In fact in the device illustrated above, one may note that the needle is subject to the thrust deriving from the static upstream pressure which acts on the section area of the stem 23.

This upstream pressure acts only partially on the section area of the stem, because of the fact that the effective pressure is the difference between pressure in the inlet duct and in the internal chamber of the ogive.

The thrust deriving from the above differential pressure adds to a thrust deriving from the action on the section area of the needle 18 of the differential pressure between the internal chamber of the ogive and the outlet duct 16.

In general, when the calibrating spring 29 is orthogonal to the lever 26, as in known valves, an equivocal relation between the thrust on the disc 24 and the position of the needle 18 and therefore of the plug 9 is created; the characteristic-curve may not be the desired one.

Figure 4:
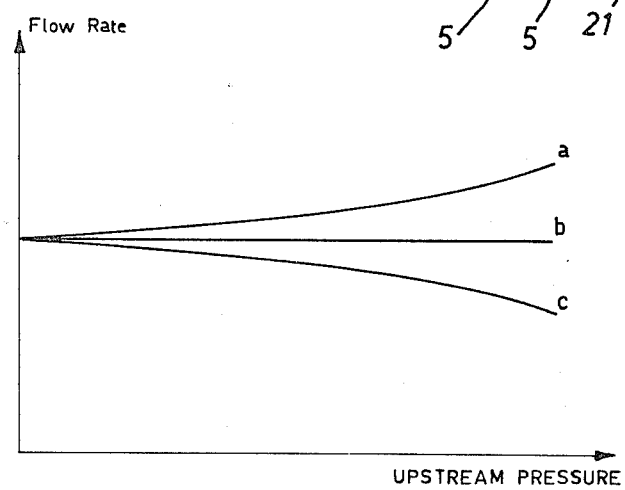
FIG. 4 shows some characteristic-curves of the flow rates as a function of the upstream pressure, of which (a) is the characteristic curve of an under-limiting condition (b) is the desired caracteristic-curve and (c) is the characteristic-curve of an overlimiting condition; all these curves may be obtained in the valve according to the invention.

According to the present invention, if the spring is inclined to the lever 26, in such a manner that the torque rendered in respect of the pin 21 will be constant, the needle and therefore the plug 9 will travel until an equilibrium position is achieved between the torque created by the thrust on the disc and the torque exerted by the spring, thus maintaining the characteristic-curve perfectly horizontal (as (b) in FIG. 4).

In order to obtain the situation above, the tilt of the spring will be well determined and definite.

To overcome the further effect of the static upstream pressure which acts partially on the section areas of the stem and of the needle in the known cases no measure may be adopted.

According to the invention, on the contrary, it is sufficient to choose a terminal bolt 31 more or less close to the pin 21, to obtain respectively a characteristic-curve as (a) or (c) in FIG. 4 depending on the desired result.

What I claim is:

1. In a valve for maintaining the rate of flow of a fluid through a pipe substantially constant, said valve comprising:
    a valve body (1, 8, 11) having a fluid inlet port and a fluid outlet port,
    a hollow member (4) within said body between said ports defining a central chamber,
    a first duct (5) connecting said inlet port to said chamber,
    a second duct (16) connecting said outlet port to said chamber, and
    a valve member (9) movable in response to pressure changes within said chamber and cooperating with a valve seat (10) in said body to control said fluid flow,
    thrust-responsive means (22, 23, 24) positioned to receive the hydrodynamic thrust of fluid entering said valve-body through said inlet port, and connected to control the flow of fluid through said second duct in dependence on said thrust, thereby controlling the pressure within said chamber and the position of said valve member,
    the improvement which comprises:
    a lever (20) pivotally connected to said thrust-responsive means and fixed to a pin (21) which can rotate about its own axis and projects from the valve body (1, 8, 11), a fork-shaped appendix (26) keyed on the pin (21), external to the valve body, a member (27) sliding between the arms of the fork shaped appendix under the action of a screw (28); a calibrating spring (29) inclined to the axis of the appendix which connects the sliding member (27) to the body (8), and a spring (37), biassing said appendix in the opposite direction from that in which it is biassed by the spring (29).

2. A valve as claimed in claim 1, in which the spring (37) biasses the appendix (26) through an intermediate transverse shaft (34) having a recess (33) which engages a projection (32) projecting from the appendix (26).

3. A valve as claimed in claim 2, in which the recess (33) is larger than the diameter of the appendix (32), to permit the free movement of the latter.

4. A valve as claimed in claim 1, in which the shaft (34) engages a pneumatic piston (36) which operates the shaft against the thrust of the spring (37).

5. Valve as claimed in claim 1, comprising a piston chamber, a fluid pressure responsive piston in said chamber, and a lost motion connection between said piston and lever whereby movement of said piston relative to said lever beyond a predetermined limit will swing said lever to actuate said valve.

6. Valve as claimed in claim 5, comprising additional spring means resiliently biassing said piston to a position in which it permits closing of said valve.

7. Valve as claimed in claim 6, comprising an auxiliary piston aligned with said first mentioned piston in said piston chamber at the opposite end of said first-mentioned piston from said additional spring means, and fluid ports in said valve chamber permitting the successive actuation of said pistons.

8. In a valve for maintaining the rate of flow of a fluid through a pipe substantially constant, said valve comprising:
    a valve body (1, 8, 11) having a fluid inlet port and a fluid outlet port,
    a hollow member (4) within said body between said ports defining a central chamber,
    a first duct (5) connecting said inlet port to said chamber,
    a second duct (16) connecting said outlet port to said chamber, and
    a valve member (9) movable in response to pressure changes within said chamber and cooperating with a valve seat (10) in said body to control said fluid flow,
    thrust-responsive means (22, 23, 24) positioned to receive the hydrodynamic thrust of fluid entering said valve-body through said inlet port, and connected to control the flow of fluid through said second duct in dependence on said thrust, thereby controlling the pressure within said chamber and the position of said valve member,
    the improvement which comprises:
    a lever (20) pivotally connected intermediate its end to said valve body for swinging movement through a median position between two extreme positions, one end of said lever being pivotally connected to said thrust-responsive means,
    spring means (29) connected between said body and the other end of said lever and biassing said lever to swing in a direction opposite to that in which said lever is urged by said thrust-responsive means, the total force exerted by said spring means being proportional to the degree of extension of said spring means, which lies at an acute angle to said lever such that pivotal movement of said lever increases the component of said total force which is effective to resist the force applied by said thrust-responsive means as said total force decreases, and decreases said component as said total force increases.

9. Valve as claimed in claim 8, in which said body is equipped with a plurality of means for attaching said spring thereto, located at varying distances from the median position occupied by said lever.

10. Valve as claimed in claim 8, in which said increase in the effective component of said total force is directly proportional to the decrease in said total force and said decrease in said component is directly proportional to the increase in said total force.

11. Valve as claimed in claim 8, comprising means carried by said other end of said lever for adjusting the point at which said lever is connected to said spring longitudinally of said lever.

* * * * *

UNITED STATES PATENT AND TRADEMARK OFFICE
CERTIFICATE OF CORRECTION

PATENT NO. : 3,945,393
DATED : March 23, 1976
INVENTOR(S) : GIUSEPPE TEATINI

It is certified that error appears in the above-identified patent and that said Letters Patent are hereby corrected as shown below:

On the cover sheet, the following should be added:

-- [30] Foreign Application Priority Data

February 29, 1972    Italy...........46832-A/72 --.

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*